United States Patent
Daniels

(10) Patent No.: US 10,190,720 B2
(45) Date of Patent: Jan. 29, 2019

(54) REPAIR KIT

(71) Applicant: Albert Daniels, Stadtlohn (DE)

(72) Inventor: Albert Daniels, Stadtlohn (DE)

(*) Notice: Subject to any disclaimer, the term of this patent is extended or adjusted under 35 U.S.C. 154(b) by 171 days.

(21) Appl. No.: 14/894,899

(22) PCT Filed: Jun. 6, 2014

(86) PCT No.: PCT/EP2014/061808
§ 371 (c)(1),
(2) Date: Nov. 30, 2015

(87) PCT Pub. No.: WO2014/195449
PCT Pub. Date: Dec. 11, 2014

(65) Prior Publication Data
US 2016/0102800 A1     Apr. 14, 2016

(30) Foreign Application Priority Data
Jun. 6, 2013   (DE) .................. 10 2013 009 487

(51) Int. Cl.
  *F16L 55/16*   (2006.01)
  *F16L 55/17*   (2006.01)
  *F16L 55/18*   (2006.01)
(52) U.S. Cl.
  CPC .............. *F16L 55/17* (2013.01); *F16L 55/18* (2013.01)
(58) Field of Classification Search
  CPC ... F16L 55/1683; F16L 55/1686; F16L 55/18; F16L 55/175; F16L 55/1612
  USPC .................................... 138/99, 97
  See application file for complete search history.

(56) References Cited

U.S. PATENT DOCUMENTS

| | | | | |
|---|---|---|---|---|
| 2,924,546 A | * | 2/1960 | Shaw | F16L 55/1686 137/15.08 |
| 3,022,209 A | * | 2/1962 | Campbell | B29C 65/28 156/158 |
| 3,439,945 A | | 4/1969 | Chambers et al. | |
| 4,257,630 A | * | 3/1981 | Bartell | B29C 65/18 285/21.2 |
| 5,362,107 A | | 11/1994 | Bridges | |

(Continued)

FOREIGN PATENT DOCUMENTS

| | | |
|---|---|---|
| DE | 3927961 A1 | 3/1990 |
| DE | 19637083 A1 | 3/1998 |

(Continued)

OTHER PUBLICATIONS

International Search Report of the International Searching Authority with English Translation issued in the corresponding PCT International Application No. PCT/EP2014/061808, dated Oct. 23, 2014 (7 pages).

(Continued)

*Primary Examiner* — Patrick F Brinson
(74) *Attorney, Agent, or Firm* — Raymond R. Ferrera; Adams and Reese LLP

(57) ABSTRACT

The invention relates to a repair kit 10, 10' for sealing conveying lines, in particular thick-matter or concrete conveying lines, comprising at least one sealing element 12, 12', the sealing element 12, 12' being a monolith or a composite component and having a base body 14 and a coating layer. The repair kit is characterized in that the base body 14 is dimenisionally stable and the coating layer has at least two layers, a first layer 16 and a second layer 18, the first layer 16 being arranged between the base body 14 and the second layer 18.

15 Claims, 2 Drawing Sheets

(56) References Cited

U.S. PATENT DOCUMENTS

Figure 1:
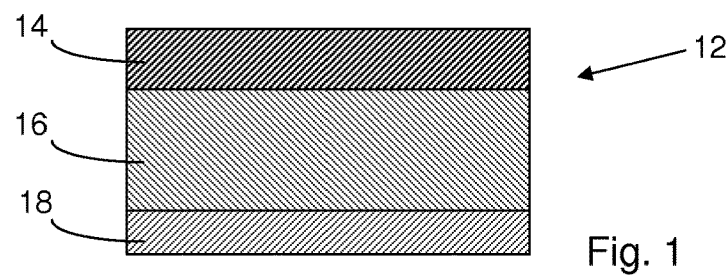

| | | | | |
|---|---|---|---|---|
| 5,632,307 | A * | 5/1997 | Fawley | F16L 55/175 |
| | | | | 138/97 |
| 6,585,298 | B2 * | 7/2003 | Panglsson | B29C 65/5042 |
| | | | | 285/294.2 |
| 7,367,362 | B2 * | 5/2008 | Rice | B29C 70/32 |
| | | | | 138/172 |
| 7,938,146 | B2 * | 5/2011 | Brooks | F16L 55/1683 |
| | | | | 138/97 |
| 8,141,592 | B2 * | 3/2012 | Rice | F16L 55/1686 |
| | | | | 138/97 |
| 8,424,571 | B2 * | 4/2013 | Brooks | F16L 55/1683 |
| | | | | 138/97 |
| 2002/0106954 | A1 | 8/2002 | Sakumoto | |
| 2008/0017263 | A1 * | 1/2008 | Robinson | B29C 70/32 |
| | | | | 138/99 |

FOREIGN PATENT DOCUMENTS

| | | |
|---|---|---|
| DE | 202012104166 U1 | 11/2012 |
| NO | 2009/035947 A1 | 3/2009 |
| WO | 00/73690 A1 | 12/2000 |
| WO | 2014/195449 A1 | 12/2014 |

OTHER PUBLICATIONS

Written Opinion of the International Search Authority (Form PCT/ISA/237) with English Translation issued in the corresponding PCT International Application No. PCT/EP2014/061808, dated Oct. 23, 2014 (10 pages).

International Preliminary Report on Patentability Chapter I issued in the corresponding PCT International Application No. PCT/EP2014/061808, dated Dec. 8, 2015 (6 pages).

* cited by examiner

REPAIR KIT

The invention relates to a repair kit for sealing conveying lines, in particular thick-matter or concrete conveying lines.

Leaky spots in conveying lines are a known problem. With conveying lines, particles contained in media to be conveyed cause abrasive wear of these lines which ultimately may lead to a leakage. Leaky spots are only difficult to seal in situ, that means for example on a construction site. Occasionally, pressures in concrete conveying lines are very high (over 80 bar). Seals must withstand these pressure rates and must not loosen from these lines due to these pressure rates.

Now, therefore, it is the object of the present invention to provide a repair kit by means of which leaky spots in lines can be sealed quickly, simply and cost-effectively.

This object is achieved by a repair kit having the features of claim 1. Advantageous embodiments are subjects of the dependent claims. It should be noted that the features described individually in the claims can also be combined with each other in any arbitrary and technologically sensible manner, thus presenting further embodiments of the present invention.

The inventive repair kit for sealing conveying lines, in particular thick-matter or concrete conveying lines, is comprised of at least one sealing element, the sealing element being a monolith or composite component and having a base body and a coating layer. The repair kit distinguishes itself in that the base body is dimensionally stable and in that the coating layer comprises at least two layers, a first and a second layer, with the first layer being arranged between the base body and the second layer.

As compared with prior art, the inventive repair kit has an advantage in that it permits sealing leaky spots quickly, safely, and cost-effectively, and in particular in situ, e.g. at a construction site where no special tools or repair materials are available. By way of the special configuration of the layers, the sealing element optimally adapts itself to the contour of the conveying line. For its fastening to a conveying line above a leakage to be sealed, the sealing element can furthermore be combined with a commercially available coupling (also designated as pipe clamp or box coupling), for example like a coupling usually applied in connecting line sections of a conveying line.

The sealing element can be configured as a one-part and/or monolithic or multiple-part, preferably two-part composite component. A multiple-part setup is particularly beneficial, if the leakage at the line is so large that several couplings have to be clamped side by side on the line to be able to cover the leakage. Here, it is possible to lay a continuous coating layer onto the leakage. Inserted into the individual couplings is at least one base body for transferring the locking forces onto the coating layer. A plate, preferably consisting of metal, may additionally be arranged between the base body and the coating layer. If there are several base bodies, then this plate among others ensures a stable bridging of the small gap between the base bodies. On the whole, an improved and/or increased contact pressure can be achieved by way of this plate, thus improving the sealing of the leakage.

To increase resistance to deformation of the base body, strength-improving components and/or additives like steel armours, Kevlar, hard plastics or the like can be embedded into the base body.

The first and the second layer of the coating layer may have different hardness degrees. Ideally, the first layer has a higher degree of hardness than the second layer. Hereby, sealing of the leakage can be assured. Owing to its hardness and the resistance thus entailed, the first layer transfers the contact pressure generated by the coupling to the layer lying underneath. Owing to its lesser degree of hardness, the layer lying underneath adapts itself well to the shape of the line.

Advantageously, the first layer has a Shore-A hardness which roughly ranges between 80 and 95. Ideally, the Shore-A hardness amounts to roughly 85. With such a Shore-A hardness, the layer has a relatively high hardness and resistive force so that the contact pressure generated by the coupling can be absorbed by the first layer and transferred to the second layer lying underneath. Hereby, the compression of the second layer onto the pipe is optimized.

The second layer preferably has a Shore-A hardness which ranges between 50 and 60. Ideally, the Shore-A hardness amounts to roughly 55. With such a Shore-A hardness, the layer has good deformability so that it can be assured that the sealing element lays itself optimally to the line and thus seals the leakage safely.

The coating layer of the sealing element preferably comprises another third layer. The third layer borders the second layer and in mounted status of the repair kit it sits closely at the line. Ideally, the third layer has a Shore-A hardness of 70 to 80, preferably roughly Shore-A 75. Since the third layer has a higher Shore-A hardness than the second layer, the coating layer is strengthened by the use of a the third layer, it becomes stiffer.

The first layer has a thickness of preferably more than 10 mm, in particular more than 12 mm. A sufficiently high stiffness can hereby be assured. The second as well as the third layer preferably have a thickness of just a few millimeters. Preferably, the thickness ranges between 2 and 3 mm.

The coating layer may extend beyond the dimensions of the base body. This is of special advantage if the leakage is located in a welding seam or at a kink of the line. A safe attachment of a box coupling in these areas is possible only with certain difficulties. To make sure that the coating layer is pressed as tightly as possible onto the line, a plate, which preferably is dimensionally stable, is arranged between the base body and the coating layer.

Preferably, a fastening means is provided at the sealing element. The fastening means serves for fastening the sealing element at a coupling or retaining element. Fastening is ideally executed by means of a magnet or an adhesive bond. However, a frictionally-engaged connection is also conceivable. Advantageously, the fastening means is arranged at the base body. In principle, the sealing element can also be retained by form-fit connection in the retaining element and/or coupling.

In an advantageous embodiment, the sealing element has a sealing bead at the layer of the cotating layer which in mounted status lies closely on the line, that means on the side facing the line. Preferably, the sealing bead is a ring-shaped sealing bead, that means a sealing bead forming a border around the leakage to be sealed. Owing to the sealing bead, the contact pressures act on a smaller area whereby a higher surface pressure is generated which in turn leads to a better sealing efficiency.

Preferably, the repair kit can be built-in into conventional couplings. To avoid the need of furnishing individual repair kits for each coupling type and/or coupling size, a spacer can be provided for being arranged at the sealing element. Corresponding to the existing coupling, a matching spacer is fastened at the sealing element. Advantageously, the spacer is connected to the sealing element in a firmly-bonded manner, in particular by means of an adhesive layer. By way of such a configuration, a repair kit of a certain size can be built into different box couplings.

Advantageously, the repair kit comprises at least one coupling, preferably in form of a box coupling or a pipe clamp as outlined hereinabove. Such a coupling typically comprises two coupling shells which in closed status form a border to a circular opening for the conveying line, wherein these coupling shells at one end are swivable against each other via a hinge about an articulated axle extending axially parallel to the circular opening, wherein one coupling shell comprises a locking element located at its end lying opposite to the hinge and wherein the other coupling shell comprises a locking mechanism located at its end lying opposite to the hinge, the said locking mechanism co-acting with the locking element. The locking mechanism may comprise, for example, a locking hook which encompasses the locking element in a form-fit arrangement when being in closed position and which pulls the coupling shells against each other at the disconnecting point lying opposite to the hinge, the locking hook being detachable from the locking element during the opening procedure. For arresting in closed position, the locking hook may be coupled to a top dead-center lever. According to the present invention, the sealing element lies with its coating layer on the leaky spot of the conveying line and is pressed by the coupling in closed position with high contact pressure onto the line so that the leaky spot is safely sealed. Preferably, the coupling shell of the coupling accommodates in itself the sealing element at least partly, preferably the base body. The coating layer of the sealing element may be broader than the cross-section of the coupling shell. This is advantageous, for example, if the leakage is located in a welding seam or at a kink of the line, i.e. at a location above which the box coupling cannot be placed directly.

It is also conceivable that the repair kit apart from the coupling and the sealing element comprises a spacer which mainly corresponds to the dimensions of the sealing element. By using a spacer, the contact pressure of the sealing element onto the pipe is increased and the sealing of the leakage is improved. In mounted status, the spacer as well as the sealing element is at least partly arranged in the box coupling and preferably, it rests closely at the line to be sealed in a position preferably staggered by 180° (in relation to the line axis) versus the sealing element. Hereby, the pressure distribution on the line can be homogenized. In principle, it is also conceivable to use a further sealing element as spacer.

The coating layer may be broader than the cross-section of the coupling. This is conceivable in particular if a correspondingly dimensioned metal plate is inserted between the dimensionally stable base body of the sealing element and the soft coating layer. The contact pressure of the sealing face on the whole can be increased by way of constructive measures (gusset plates, diagonal braces, or the like).

If the leakage is especially large, then the repair kit may comprise several couplings which are arranged side by side along the line run. Preferably, the sealing element can be configured as a composite component. It comprises at least as many base bodies as couplings are used. Furthermore, the sealing element in this configuration comprises a unique, continuous coating layer which connects the base bodies with each other. Advantageously, a metal layer may be arranged between the base bodies and the coating layer. In particular, the metal layer serves for a stable bridging of the gap between the base bodies. Hereby, the contact pressure generated by the couplings can be distributed evenly on the coating layer.

The invention as well as its technical environment are explained in greater detail in the following by way of various figures. It should be noted the these figures show a particularly preferred design variant of the present invention. However, the invention is not restricted to the shown design variant. In particular, the present invention encompasses arbitrary combinations of technical features, inasmuch as it makes technical sense, listed in the claims or described in the description as being relevant for the invention.

Figure 2:
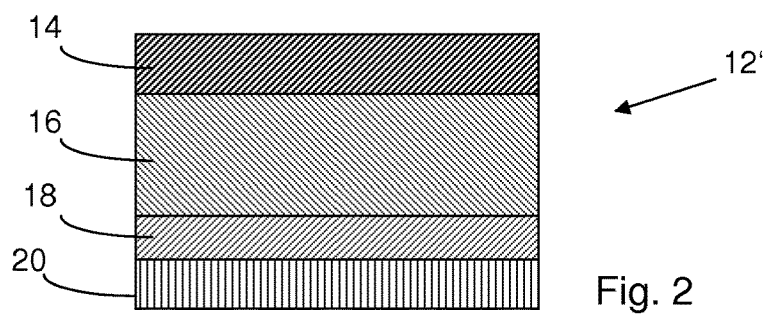
Figure 3:
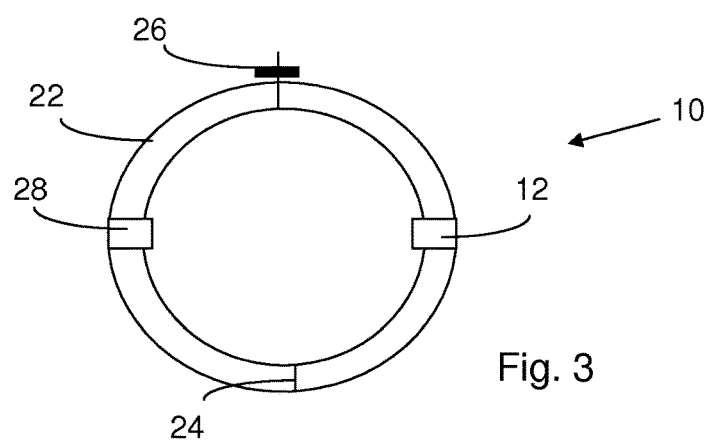
Figure 4:
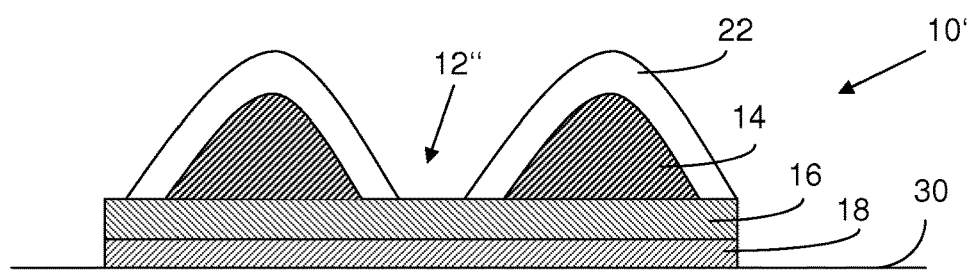
Figure 5:
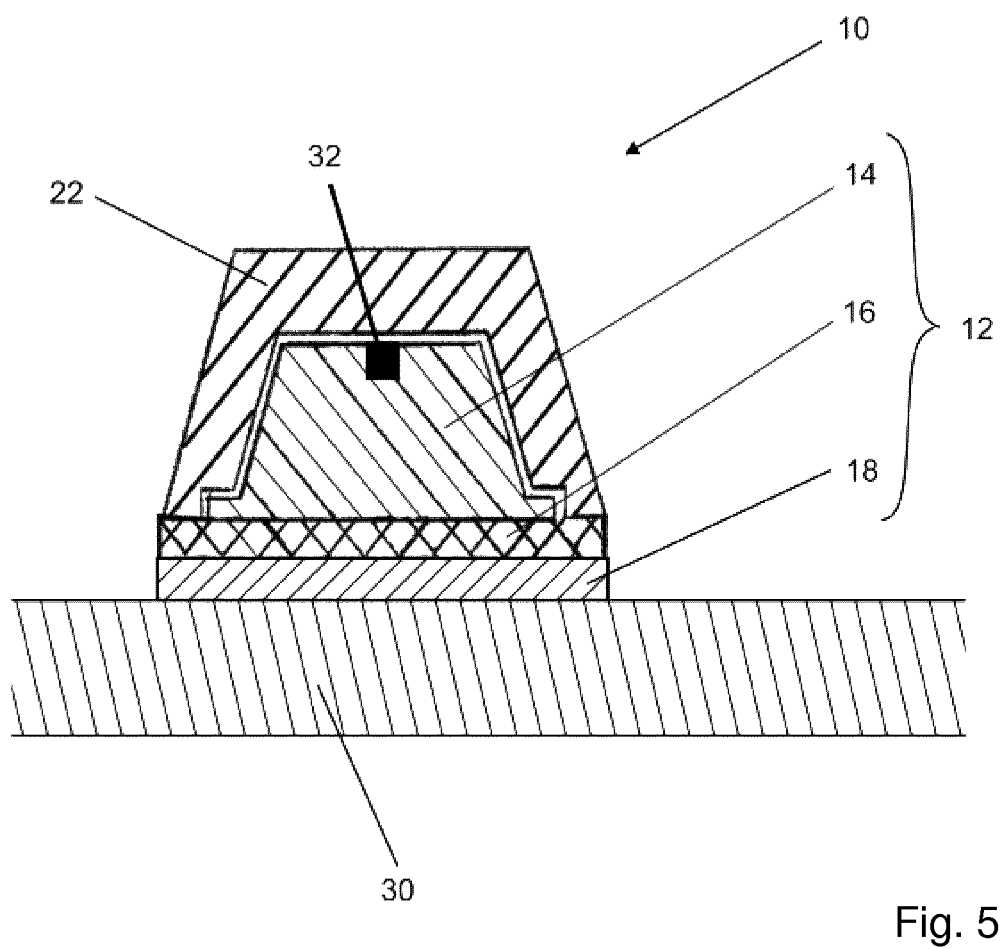

Where:

FIG. 1 is a schematic sectional view of an inventive sealing element in a first embodiment, FIG. 2 is a schematic sectional view of an inventive sealing element in a second embodiment, FIG. 3 is a schematic view of an inventive repair kit in a first embodiment, FIG. 4 is a schematic view of an inventive repair kit in a second embodiment, FIG. 5 is a schematic sectional view of an inventive repair kit arranged at a conveying line in a third embodiment.

FIG. 1 shows a schematic sectional view of an inventive sealing element 12 in one embodiment. The sealing element 12 is monolithic and comprises a dimensionally stable base body 14 as well as a coating layer. The coating layer is composed of two layers, a first layer 16 and a second layer 18. The first layer 16 is arranged between the base body 14 and the second layer 18. The first layer 16 and the second layer 18 have different degrees of hardness. Ideally, the first layer 16 has a higher degree of hardness than the second layer 18. Hereby, the sealing of a leaky spot can be improved. Owing to its relatively high degree of hardness and the associated resistance, the first layer 16 transfers the contact pressure generated by a coupling (not illustrated in FIG. 1) to the layer located underneath. Owing to its relatively lower degree of hardness, the second layer 18 located underneath adapts itself well to the shape of a line 30 to be sealed.

FIG. 2 shows a schematic sectional view of an inventive sealing element 12' in a second embodiment. As compared to sealing element 12, the sealing element 12' comprises an additional layer 20. The third layer 20 preferably has a Shore-A hardness which ranges between the degrees of hardness of the other layers 16, 18. The coating layer is strengthened by the use of this third layer, it becomes stiffer. However, it just becomes stiffer in such an extent that it still can adapt itself optimally to the contour of line 30.

FIG. 3 is a schematic view of an inventive repair kit 10 in a first embodiment. The repair kit 10 comprises at least one box coupling 22. The box coupling 22 is comprised of two coupling shells which in closed status border a circular opening for the conveying line, the coupling shells at one end being swivable against each other via a hinge 24 about an articulated axle being axially parallel to the circular opening. At their end lying opposite to the hinge, the coupling shells comprise a locking element 26 which pulls the coupling shells against each other at the disconnecting point lying opposite to the hinge 24. According to the present invention, the sealing element 12 with its coating layer lies on the leaky spot of the conveying line (not illustrated in FIG. 3) and is pressed by the coupling 22 in closed status with high contact pressure onto the line so that the leaky spot is safely sealed. The repair kit 10 furthermore comprises a spacer 28 which in its dimensions mainly corresponds to those of the sealing element 12. In mounted status, the spacer 28 like the sealing element 12 is arranged at the box coupling and, as shown in FIG. 3, it rests closely at the line to be sealed in an arrangement staggered by 180° versus the sealing element 12.

FIG. 4 shows a schematic sectional view of an inventive repair kit 10', which is mounted on a line 30, in a second embodiment. Repair kits 10 of this kind are utilized if the leakage is especially large and if several couplings 22 have to be used. The sealing element 12" comprises a multitude of base bodies 14 which at least corresponds to the number of couplings 22. The base bodies 14 are arranged in the couplings 22. Furthermore, the sealing element 12" comprises a unique continuous coating layer which extends over the entire width.

FIG. 5 is a schematic sectional view (sectional plane parallel to the axis of the line 30) of an inventive repair kit 10 in a third embodiment. The repair kit 10 comprises a ring-shaped box coupling 22 (see FIG. 3). According to the present invention, the sealing element 12 with its coating layer lies on the leaky spot of the wall of the conveying line 30 and is pressed by the coupling 22 in closed status with high contact pressure onto the line 30 so that the leaky spot is safely sealed. The coupling shell of the box coupling 22 accommodates the base body 14 of the sealing element 12. The outer contour of the base body 14 is accordingly adapted to the inner contour of the box coupling 22. A magnet 32 arranged at the base body 14 keeps the sealing element 12 in the coupling shell for as long as the box coupling 22 is not closed around the line 30.

The invention claimed is:

1. A repair kit for sealing at least one of thick-matter conveying lines or concrete conveying lines, said repair kit comprising at least one sealing element, wherein the sealing element further comprises a monolithic component having a dimensionally stable base body and a coating layer, wherein a fastening means is disposed adjacent to the both the base body and the sealing element so that the sealing element can be fastened to a coupling.

2. A repair kit according to claim 1, wherein strength-increasing elements, in particular at least one of a steel armor, a Kevlar, and a hard plastics are embedded in the base body to increase resistance to deformation.

3. A repair kit according to claim 1, wherein a first layer and a second layer of the coating layer have different degrees of hardness.

4. A repair kit according to claim 3, wherein the first layer of the coating layer has a higher Shore-A hardness than the second layer.

5. A repair kit according to claim 4, wherein the first layer has a hardness between Shore-A 80 and Shore-A 85.

6. A repair kit according to claim 4, wherein the second layer has a hardness between Shore-A 50 Shore-A 60.

7. A repair kit according to claim 3, wherein the coating layer comprises a third layer disposed adjacent to the second layer.

8. A repair kit according to claim 7, wherein the third layer has a hardness between Shore-A 70 and Shore-A 80.

9. A repair kit according to claim 1, wherein the coating layer is configured broader and/or longer than the base body.

10. A repair kit according to claim 1, wherein a metal plate is disposed between the base body and the coating layer.

11. A repair kit according to claim 1, wherein a sealing bead is disposed adjacent to the coating layer.

12. A repair kit according to claim 1, wherein the repair kit further comprises a box coupling comprised of at least two coupling shells which, when in a closed status, confine the conveying line in the form of a circular opening, which at one end can be swiveled toward one another on a hinge about an articulated axle that is axially parallel to the circular opening, wherein the coupling is further comprised of a locking mechanism which, when in a closed status, pulls the coupling shells against each other at a disconnecting point that lies opposite to the hinge.

13. A repair kit according to claim 12, wherein at least one of the coupling shells of the coupling mutually accommodates the sealing element.

14. A repair kit according to claim 12 wherein the repair kit comprises a plurality of couplings and the sealing element is configured as a composite component, wherein the sealing element is comprised of a plurality of base bodies, the specific number of which corresponds to the number of couplings, and a continuous coating layer.

15. A repair kit according to claim 13, wherein said at least one of the coupling shells mutually accommodates the base body.

* * * * *